(12) United States Patent
Raposa

(10) Patent No.: US 10,673,866 B2
(45) Date of Patent: *Jun. 2, 2020

(54) CROSS-ACCOUNT ROLE MANAGEMENT

(71) Applicant: Amazon Technologies, Inc., Reno, NV (US)

(72) Inventor: Michael Raposa, White Plains, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,292

(22) Filed: Feb. 15, 2019

(65) Prior Publication Data

US 2019/0182262 A1    Jun. 13, 2019

Related U.S. Application Data

(62) Division of application No. 15/204,223, filed on Jul. 7, 2016, now Pat. No. 10,250,612.

(51) Int. Cl.
*G06F 7/04* (2006.01)
*H04L 29/06* (2006.01)

(52) U.S. Cl.
CPC .......... *H04L 63/108* (2013.01); *H04L 63/08* (2013.01); *H04L 63/105* (2013.01); *H04L 63/062* (2013.01)

(58) Field of Classification Search
CPC ... H04L 63/108; H04L 63/105; H04L 63/062; H04L 63/08

USPC ............................................................ 726/6
See application file for complete search history.

(56) References Cited

U.S. PATENT DOCUMENTS

| 9,818,122 | B1 * | 11/2017 | Farry | ................. G06Q 30/00 |
| 2013/0297385 | A1 * | 11/2013 | Mehta | ............... G06Q 20/1235 705/7.35 |

OTHER PUBLICATIONS

Requirement for Restriction/Election issued in corresponding U.S. Appl. No. 15/204,223 dated May 10, 2018.
Non-Final Office Action issued in corresponding U.S. Appl. No. 15/204,223 dated Jul. 26, 2018.
Notice of Allowance issued in corresponding U.S. Appl. No. 15/204,223 dated Nov. 28, 2018.

* cited by examiner

*Primary Examiner* — Mohammad W Reza
(74) *Attorney, Agent, or Firm* — Hogan Lovells US LLP

(57) ABSTRACT

Approaches presented herein can provide for end-to-end auditing of cross-account roles. A user associated with a first account might request some degree of access to resources associated with a second account. A role can be assumed by that user that delegates access to those resources, and the user can be issued temporary credentials to obtain the access. In order to provide for full auditing of these cross-account roles, calls that assume a role in one account can be linked to resource-related calls under a different account, which can include a third party account. Information can be obtained from both accounts that can be linked using an identifier provided to each environment as part of the role assumption. The linking can provide a full audit chain from end user to resource access across the separate accounts.

20 Claims, 9 Drawing Sheets

```
{
  "eventVersion":"1.03",
  "userIdentity":{
    "type":"Assumed_Role",
    "principalId":"AROAICKBBQTXWLOLJLHW4:TestSessionCrossAccount",
    "arn":"arn:sts:: 999999999999:assumed-role/CrossAccountTest/   TestSessionCrossAccount",
    "accountId":"999999999999",
    "accessKeyId":"ASIAJJQOJ64OAM7C65AA",
    "sessionContext":{
      "attributes":{
        "mfaAuthenticated":"false",
        "creationDate":"2016-04-05T20:39:37Z"
      },
      "sessionIssuer":{
        "type":"Role",
        "principalId":"AROAICKBBQTXWLOLJLHW4",
        "arn":"arn:iam::999999999999:role/CrossAccountTest",
        "accountId":"999999999999",
        "userName":"CrossAccountTest"
      }
    }
  },
  "eventTime":"2016-04-05T20:39:39Z",
  "eventSource":"foo.ourservices.com",
  "eventName":"ListBuckets",
  "serrviceRegion":"us-east",
  "sourceIPAddress":"service Internal",
  "userAgent":"[Boto3/1.3.0 Python/3.4.4 Darwin/15.4.0 Botocore/1.4.8 Resource]",
  "requestParameters":null,
  "responseElements":null,
  "requestID":"2ED523DEA5409137",
  "eventID":"099ff820-00f2-4500-94fc-2b9da26d576f",
  "eventType":"SvcApiCall",
  "recipientAccountId":"999999999999"
}
```

FIG. 7

```
{
  "version": "0",
  "id": "c204c067-a376-47a8-a760-f0bf97b89aae",
  "detail-type": "Service API Call",
  "source": "svc.sts",
  "account": "1111111111111",
  "time": "2016-04-05T20:39:37Z",
  "region": "us-east",
  "resources": [],
  "detail": {
    "eventVersion": "1.04",
    "userIdentity": {
      "type": "IDUser",
      "principalId": "AIDAIDVUOOO7V6R6HKL6E",
      "arn": "arn:iam::1111111111111:user/jsmith",
      "accountId": "1111111111111",
      "accessKeyId": "AZIAJ2DZP3QVQ3D6VJBQ",
      "userName": "jsmith"
    },
    "eventTime": "2016-04-05T20:39:37Z",
    "eventSource": "foo.ourservices.com",
    "eventName": "AssumeRole",
    "awsRegion": "global",
    "sourceIPAddress": "72.21.196.66",
    "userAgent": "Boto3/1.3.0 Python/3.4.4 Darwin/15.4.0 Botocore/1.4.8",
    "requestParameters": {
      "roleArn": "arn:aws:iam::999999999999:role/CrossAccountTest",
      "roleSessionName": "TestSessionCrossAccount",
      "externalId": "3414"
    },
    "responseElements": {
      "credentials": {
        "accessKeyId": "ASIAJJQOJ64OAM7C65AA",
        "expiration": "Apr 5, 2016 9:39:37 PM",
        "sessionToken": "FQoDYXdzEH4aD"
      },
      "assumedRoleUser": {
        "assumedRoleId": "AROAICKBBQTXWLOLJLHW4:TestSessionCrossAccount",
        "arn": "arn:sts::999999999999:assumed-role/CrossAccountTest/TestSessionCrossAccount"
      }
    },
    "requestID": "83a263cd-fb6e",
    "eventID": "e5a09871-dc41",
    "eventType": "SvcApiCall"
  }
}
```

FIG. 8

CROSS-ACCOUNT ROLE MANAGEMENT

CROSS-REFERENCES TO RELATED APPLICATIONS

This application is a divisional of allowed U.S. application Ser. No. 15/204,223, filed Jul. 7, 2016, entitled "CROSS-ACCOUNT ROLE MANAGEMENT," of which the full disclosure of this application is incorporated herein by reference for all purposes.

BACKGROUND

Users are increasingly performing tasks using remote computing resources, which may be offered through a shared-resource environment. This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In some instances, a user having permissions under a first account might want to perform a task requiring permissions under a second account. Using conventional approaches, the user might obtain delegated access using temporary credentials issued for the second account. Unfortunately, the use of these temporary credentials is typically not directly tied back to the actual user for whom the cross-account role was granted, at least under the second account, such that the actual user responsible for an action being performed in the second account using these credentials cannot be verified.

BRIEF DESCRIPTION OF THE DRAWINGS

Various embodiments in accordance with the present disclosure will be described with reference to the drawings, in which:

FIG. 7 illustrates an example event log from a production account that can be utilized in accordance with various embodiments.

FIG. 8 illustrates an example record for a role assumption from a development account that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources, and access to those resources, in an electronic environment. In particular, various approaches provide for the end-to-end auditing of cross-account roles in a shared resource environment. In many environments, information for a user obtaining credentials to assume a role in one environment may not be available in that environment for subsequent tracking and/or auditing, particularly when the user is associated with a different account or environment. Approaches presented herein can provide a full audit trail when electronic resources are accessed via a cross-account role. In various embodiments, information for a role assumption under a second account can be forwarded to the first account that maintains information about the user. Information about the user from the first account, along with information about the role assumption, can be sent to a location accessible to, or contained within, a second environment associated with the second account. Information for a request received to perform an action using the credentials for the assumed role can also be stored to such a location of the second environment, where the records from both environments include an identifier or other entry that can be used to correlate the records. Once the data is stored in such an accessible location, a security entity for the second account can obtain a full link between the access to the resources and the actual person or application to whom access is being provided. The different accounts can include, for example, production and development accounts, or can include one account owned by a customer and several managed service accounts that are logging into the customer account to manage the services and resources located there, where it is desirable to track back to the account that assumed the role, and specifically a user in a third party account who may have assumed the role.

Various other such functions can be used as well within the scope of the various embodiments as would be apparent to one of ordinary skill in the art in light of the teachings and suggestions contained herein.

Figure 1:
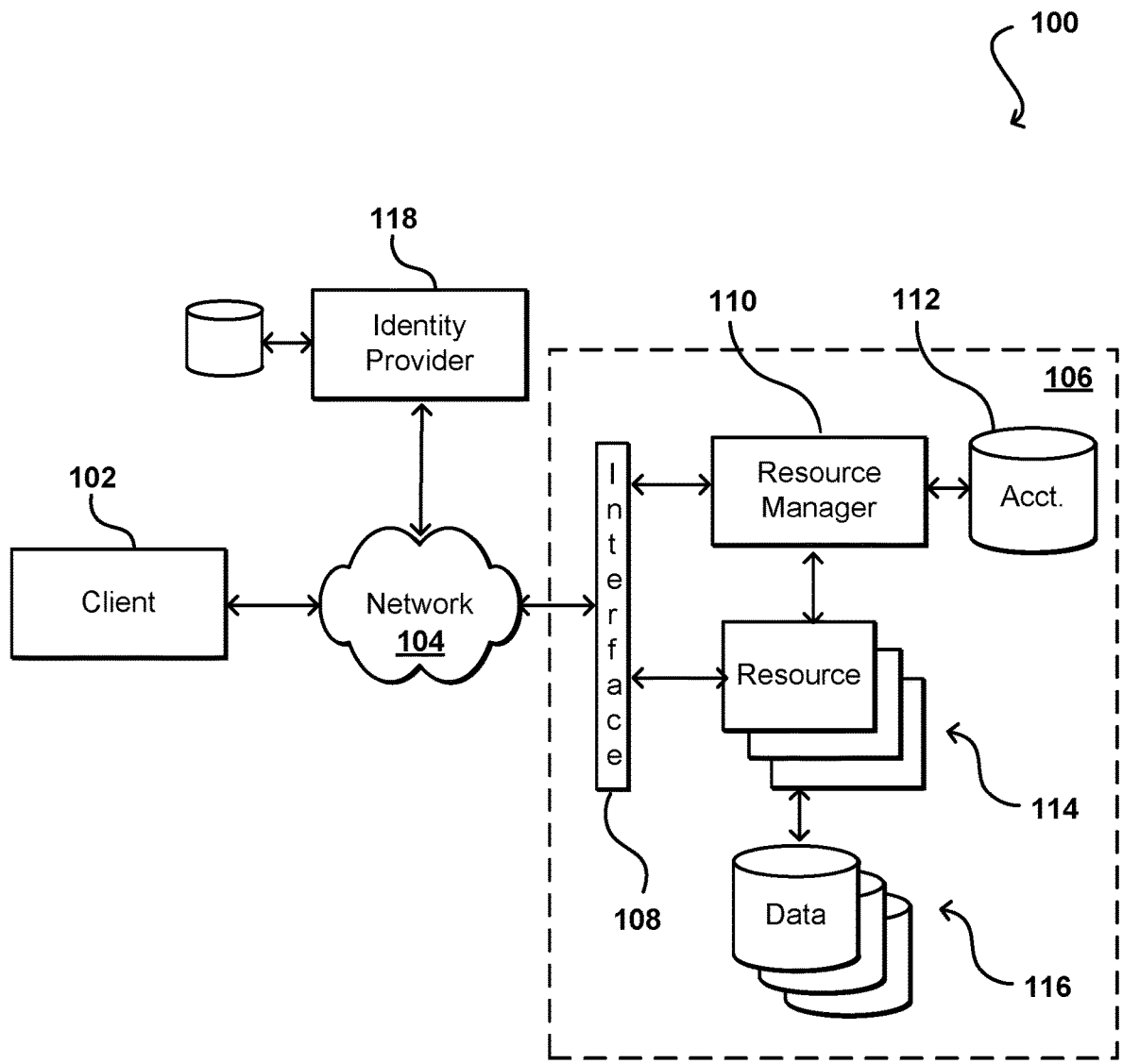
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In such a resource provider environment, there can be portions of subsets of the environments separated (physically or logically) into different sub-environments, such as a production environment and a development environment. Various customers or third parties can also have their own respective sub-environments. Other environments can exist as well, such as testing environments, management environments, and the like. Each environment can be associated with a respective account under which the environment is managed. There can be specific resources and services, or functions of those resources and services, allocated to one or more of those environments. For each of these environments, there can be different roles or levels of access provided to various users. For example, a user (i.e., a customer having an account with a provider of the resource provider environment) might have a first role in the production environment and a second role in the development environment, and each role can provide different access levels and permissions, among other such criteria or information. In order for a user having access permissions in one environment to obtain access to resources or functionality in another environment, it can be necessary in at least some embodiments for the user to obtain access credentials or role permissions in the other environment. This can involve setting up a formal role or account in the other environment, or in some embodiments can involve the user obtaining temporary access credentials for use in the second environment. In some embodiments, a customer of the second environment can delegate access to resources associated with the customer in the second environment. A developer user might want some degree of access to production resources associated with a production account, and to control access a temporary role (i.e., a cross-account role) can be created in the production account that provides the developer user with restricted access to resources associated with the production account. Using those temporary credentials, a developer user can assume the role and access the corresponding resources in the production account.

Figure 2A:
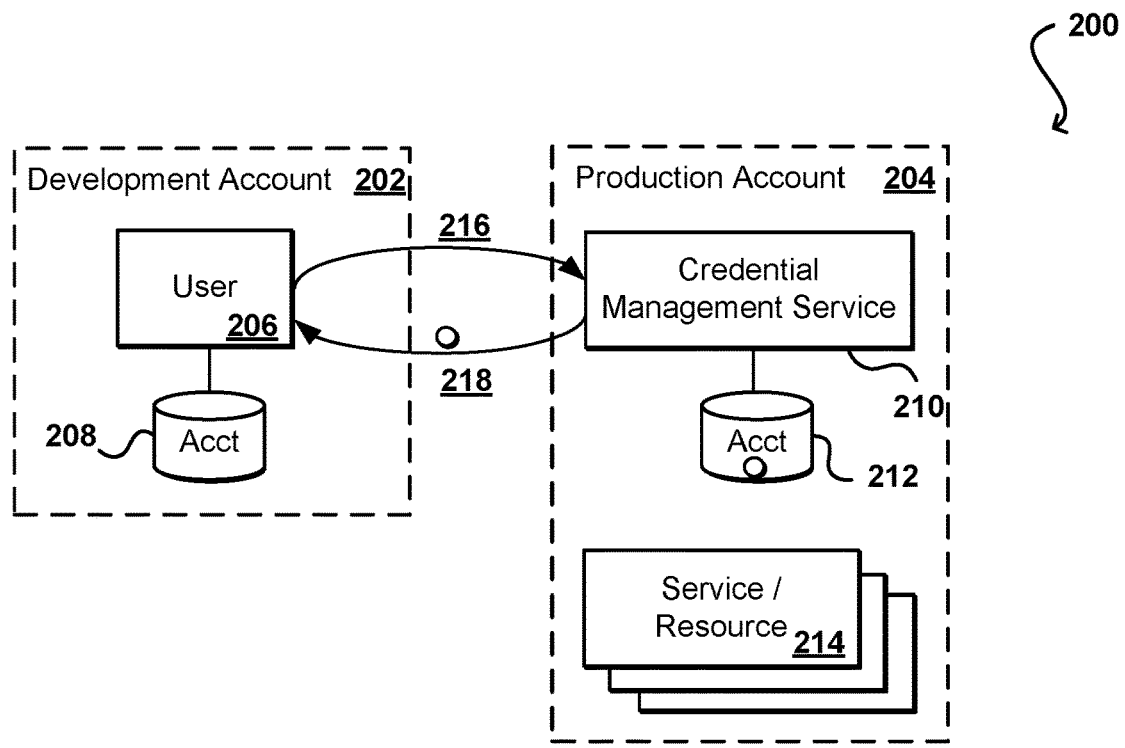
FIGS. 2A and 2B illustrate an example approach wherein temporary access credentials are provided for a user to access resources associated with a specific account that can be utilized in accordance with various embodiments.

FIG. 2A illustrates an example implementation 200 wherein information and components for a first account associated with a development environment are allocated to a development account 202, and information and components for a second account associated with a production environment are allocated to a production account 204 that can be utilized in accordance with various embodiments. Various other types of environments can be used as well as discussed elsewhere herein. In this example, a user 206 can have a development account 202 with a corresponding development account identifier, which can be stored in an account data store 208 or other repository associated with the development account 202. The user 206, as may be represented by one or more modules, virtual machines, processes, or other such components, may want to utilize one or more resources 214, services, or other such components or systems in the production environment and associated with a production account. For many providers, a "production" environment can relate to components that enable tasks to be performed as part of the business of a provider or customer, such that careful access control can be desirable in order to avoid issues or unauthorized access to the business processes or other such functionality. Thus, in order to obtain access rights to the one or more resources, the user in this example must obtain a temporary credential corresponding to the production account.

In this example, a system, process, or component associated with the user 206 submits a request 216 to a credential management service 210 associated with the production account 204. Information for the request, as may be contained in the request and/or associated with the request, can be analyzed by the credential management service 210, or a related system or service, in order to validate the request and determine that the user has the appropriate permission to obtain temporary credentials for the request. This can include various authentication and/or authorization processes as known in the art for determining access rights to various resources or services in an electronic environment. In at least some embodiments, this can involve comparing information for the request against account information 212 stored in an account data store or other such location. If the user request is validated, one or more temporary credentials can be issued and provided in a response 218 to the user. A temporary credential can take any of a number of forms, such as a secure token or a username and password (encrypted or otherwise) that will expire after a period of time or number of uses, among other such options. Information for the temporary credential, or the credential itself, can also be stored locally, such as in the account data store 212.

Figure 2B:
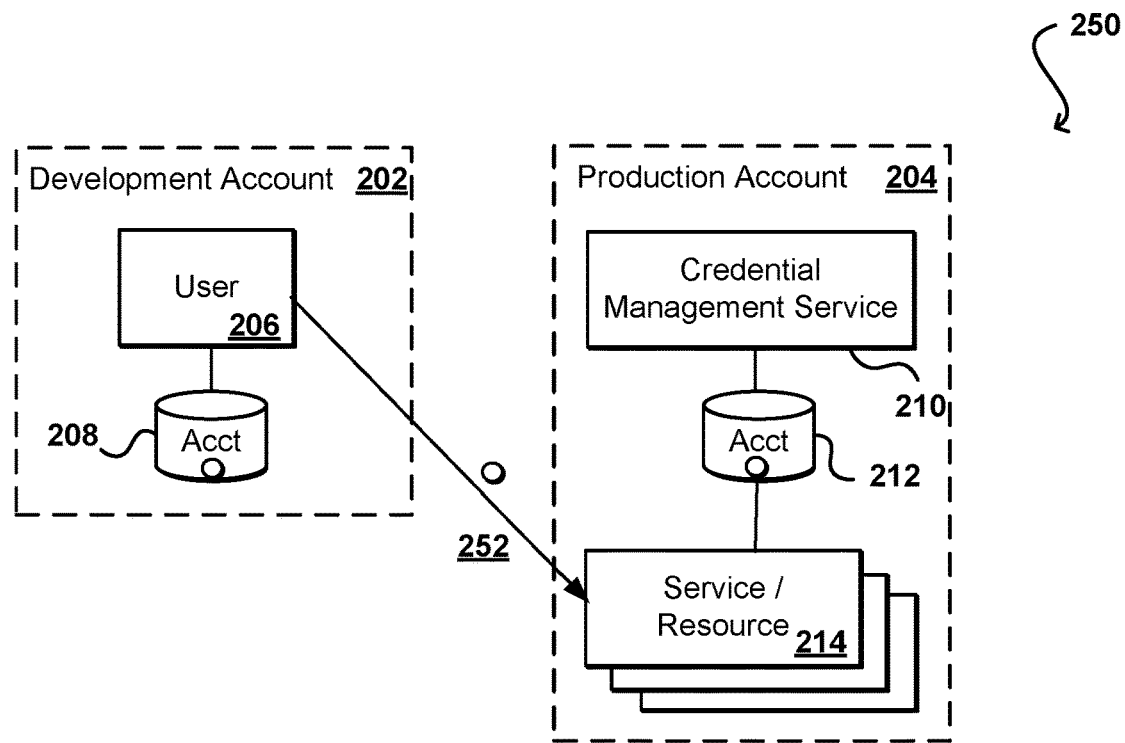

Once the user has received the temporary credentials, the credentials can be stored locally to the development account 202, such as in local cache memory or a development account data store 208, or other such location, as illustrated in the example situation 250 of FIG. 2B. When the user wants to access the resources, the user can cause a request 252 to be submitted to a location associated with the production account 204, such as an API associated with the type of request and associated services and/or resources 214. The request can include or otherwise specify the temporary credential, which can enable the appropriate services and/or resources to process the request, at least to the extent permitted by the corresponding permissions and other such information. As mentioned, the production and/or development accounts can be associated with the provider, the same or separate customers or users, or third party accounts, among other such options. Even in a situation where a customer might want to give a resource manager limited access rights to a production account to perform maintenance or a specific action, the resource manager must first assume a role in at least some embodiments to gain access to those resources.

As mentioned, a potential downside to such an approach is that it can be difficult to track and audit the identity of entities (i.e., people, systems, or processes) that are assuming various roles within an environment from a different environment. Further, it can be difficult to track what each of these entities is doing, or has done, in the environment after assuming that role. In some embodiments, an event logger or other such service associated with the production account can record information for API calls for specific resources or services, where that information can include data such as the identity of the caller, the time of the call, the source address of the caller, the call parameters, and the response elements returned by the resource(s) and/or service(s). Even with this information, however, it is not possible to determine with certainty identity information for the user that initially assume the role. Information about the person (or other entity) who assumed the role is only available in the development account. For example, a record might indicate that a certain call was made for a specified role that exists in the production account. The information for the user assuming that role is thus also only available in the development account. Various policies, rules, or restrictions can be provided for the role, as is known for enabling entities to take on roles within various contexts.

Accordingly, approaches in accordance with various embodiments can attempt to determine with certainty the identity of a user (or other entity) who assumed a role, and ensure that for any incoming request to a specific environment that requires the role that the user making the request is the same as, or at least authorized or delegated access by, the user who assumed the role. Approaches in accordance with various embodiments can provide a specific piece of data, such as an access identifier (ID) or access key ID, when a user assumes a role for a specific account. The specific piece of data can also be associated with the temporary credentials within the specific account, such as the production account. The identifier can then be used to link the actions to the user performing the action and the user who assumed the role, and to verify whether an action received on behalf of a user corresponds to a user who assumed the role for that environment. In order to allow for the linking, it further can be desirable to have the information available from a location that does not require specific access credentials from any of the respective accounts or environments. Thus, in at least some embodiments the information is published or otherwise stored to a location that can be accessed from any or all of the respective accounts or environments, or even from outside those accounts or environments, for purposes such as auditing and reporting.

Figure 3:
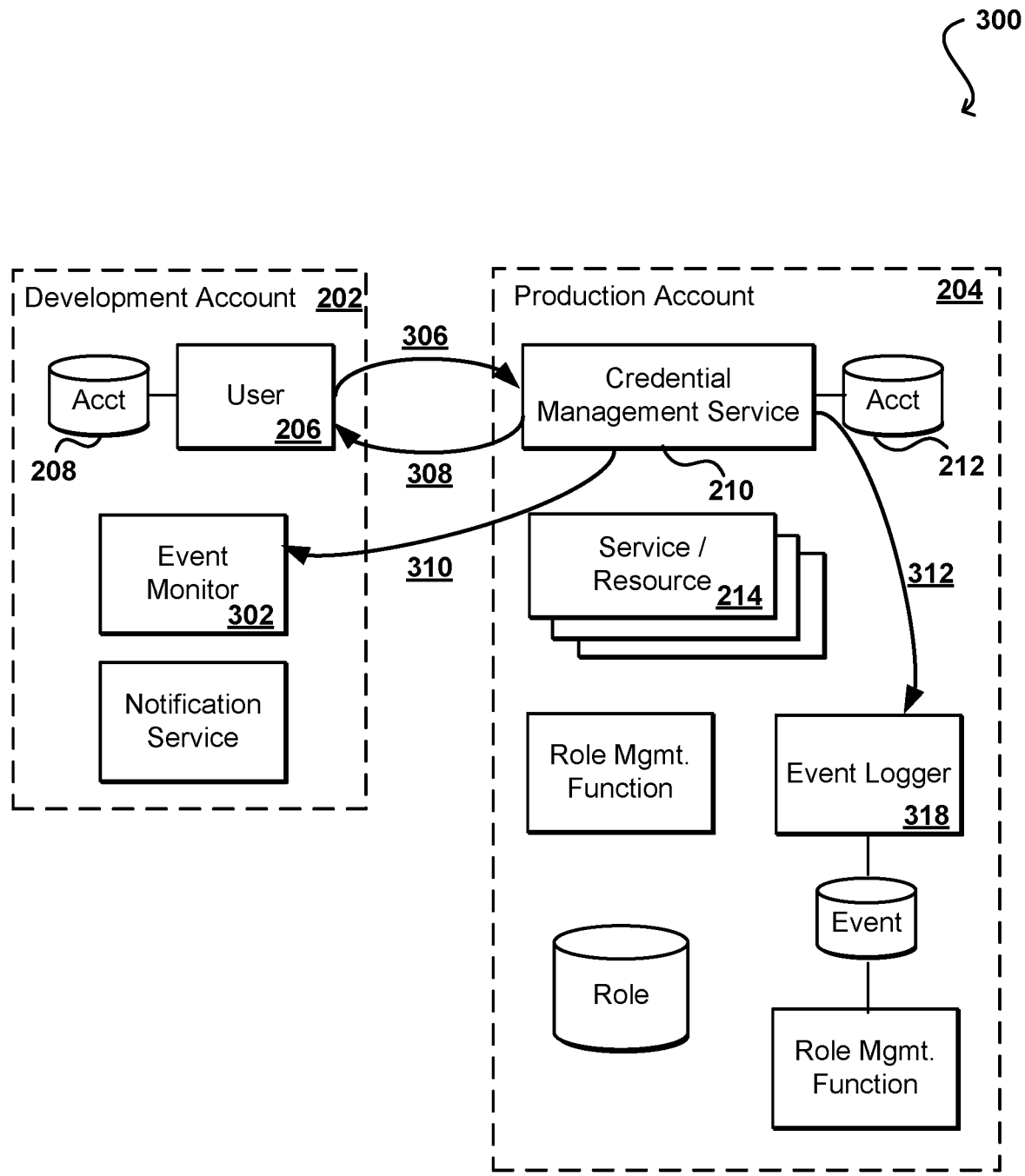
FIG. 3 illustrates an example approach to causing information for temporary access credentials to be provided to components for both production and development accounts in accordance with various embodiments.

FIG. 3 illustrates an example implementation 300 that can be used to provide such functionality within the scope of the various embodiments. In this example, a user 206 can again have a development account 202 associated with a development environment. It should be understood that reference numbers may be carried over between figures for similar elements for purposes of simplicity of explanation, but that such usage should not be interpreted as a limitation on the scope of the various embodiments unless otherwise specifically stated. As in the previous example, the user (or a system, process, or component acting on behalf of the user) can submit a request 306 to an interface associated with a production account 204, for example, which can cause a system or service such as a credential management service 210 to evaluate the request to determine whether access rights should be provided in response to the request. As discussed above, information for the request can be processed (i.e., authenticated, authorized, and/or validated) to determine whether the access should be granted. If access rights or other permissions are to be granted, one or more temporary credentials can be generated and provided in a response 308 to the user. As mentioned, the temporary access credentials can take the form of a secure key, access token, or username/password pair, for example, and can enable the user 206 to assume a specific cross-account role within the production environment and associated with the production account 204.

Upon receiving the temporary credentials, the user 202 can store the information to an account data store 208 or other such location, such as by storing in cache memory in some embodiments. The user can then use the set of temporary credentials to access resources and services 214 in the production environment and under the production account 204. In addition, a component such as an event monitor 302 that is associated with the development account 202 can detect an event corresponding to the API (or other interface) call to assume the role in the production environment. Through detecting the event, the event monitor can obtain, through a call, request, or other communication 310, information for the assumption of the role, as may include information such as a user identifier, user access identifier, or user access key identifier associated with the user 206 who assumed the role. In this way, information for the role assumption is available within the development account 202. A similar process can be utilized to ensure that such information is also available within the production account 204. In this example, information for an event corresponding to assumption of the role can be provided 312 as event record data to an event logger 318. In some embodiments the event log information might be provided at different times, such as in response to an API call from the user 206 that uses the temporary credentials to attempt to gain access to the specified resources and/or services 214.

Figure 4:
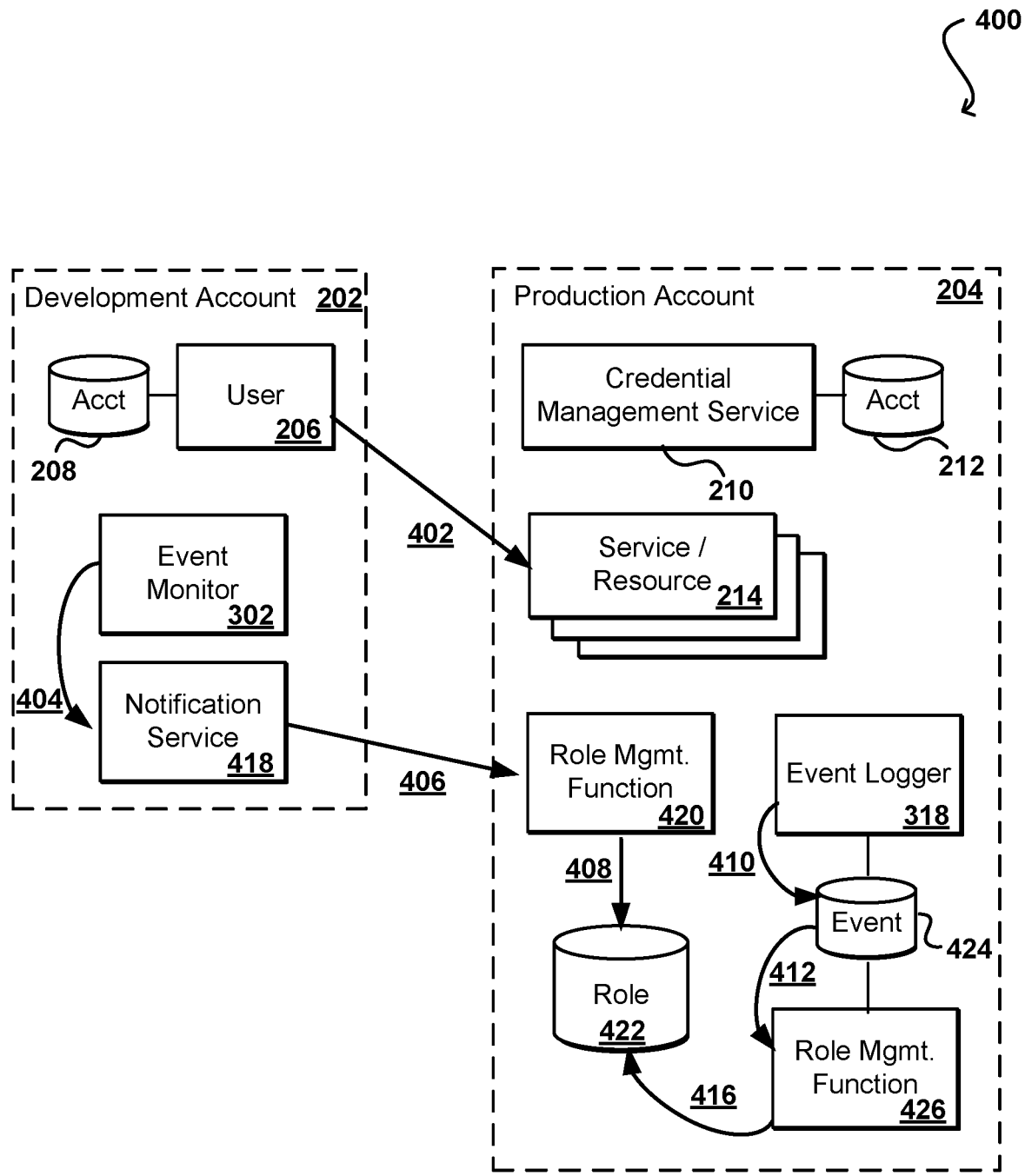
FIG. 4 illustrates an example approach in which the information from the development and production accounts can be stored in, and correlated from, a role data store in accordance with various embodiments.

The role assumption information from the development account and from the production account can then be combined in order to enable user identity to be determined and or verified for various embodiments. As an example, the situation 400 illustrated in FIG. 4 shows the user 206 using the temporary access credentials when submitting a request 402 for access to various resources and/or services 214 of the production account, in order to have certain tasks performed or functionality executed, etc. Tasks can include any appropriate tasks, such as creating new database tables or buckets using the resources associated with the production account 204. As indicated, in some embodiments such action can cause event data to be obtained by the event logger 318 of the production account 204.

As mentioned, event data for the assumption of the role can be obtained by the event monitor 302 of the deployment account. The event monitor 302 can filter the log or event data that includes, for example, access and authorization information associated with the user and the cross-account role, and extract out the information relevant to the role acquisition. In this example, the event monitor can publish 404 a message to a notification service 418 or other messaging component of the development account 202. In some embodiments a filter on the event monitor 302 can detect any event alerts or records associated with the credential management service 210, and send the alerts/records as at least one notification to the notification service 418. The notification service 418 can then make an API call or send other such notification 406 to trigger a role management function 420 to be executed in the production environment 204. The role management function 420 can extract the event data and send 408 the data to be stored in a role data store 422 or other such location. The information can include information about the actual user 206 who assumed the role, as a result of the "assume role" call, in the production account 204.

Similarly, information for the call 402 received to the production account 204 and obtained by the event logger 318 can be sent 410 to an event data store 424, or other such location associated with the production account 204. As mentioned, this data will not identify the user having assumed the role because the only information obtained relates to the temporary credentials submitted with the request 402. In this embodiment, the storing of the information to the event data store 424 can trigger a role management function 426 to be executed in the production environment 204. The role management function 426 can download 412 or otherwise obtain the record data, and perform any appropriate action on the data. The action can include, for example, unzipping or otherwise decompressing and parsing the data (i.e., event logs) for records related to the identified role in the production account 204. Any relevant records can then have information stored 416 by the role management function 426 into the role data store 422, which stores the corresponding event data from the development account 202 as obtained through the event monitor 302 of the development account 202. Information such as the user access key ID can then be used to link the information in order to determine and/or track actions taken on behalf of the user 206 who assumed the role in the production account 204.

Such an approach is beneficial for different accounts as presented herein because there is typically no specific user tracking included in the event logging of the production account. From the point of view of the production account, the user assuming the role appears as a shared account that could be accessed by many different users. If something inappropriate is done through that shared role, it is then not possible using conventional approaches to track the actual user who caused the inappropriate action to occur. The ability to link the information as discussed herein enables the actual user to be identified and tracked for at least these purposes.

Various other approaches can be utilized within the scope of the various embodiments to pass information between disparate accounts. In some embodiments the event log data could actually be passed from one account to another, instead of the role management function handling the extraction and cross-account messaging. In such an embodiment, the event logs could be forwarded and processed like the event logs or records received to the event logger or another such system or service. The information could still be stored and linked by identifier or other entry in an appropriate role data store or other such repository.

Figure 5:
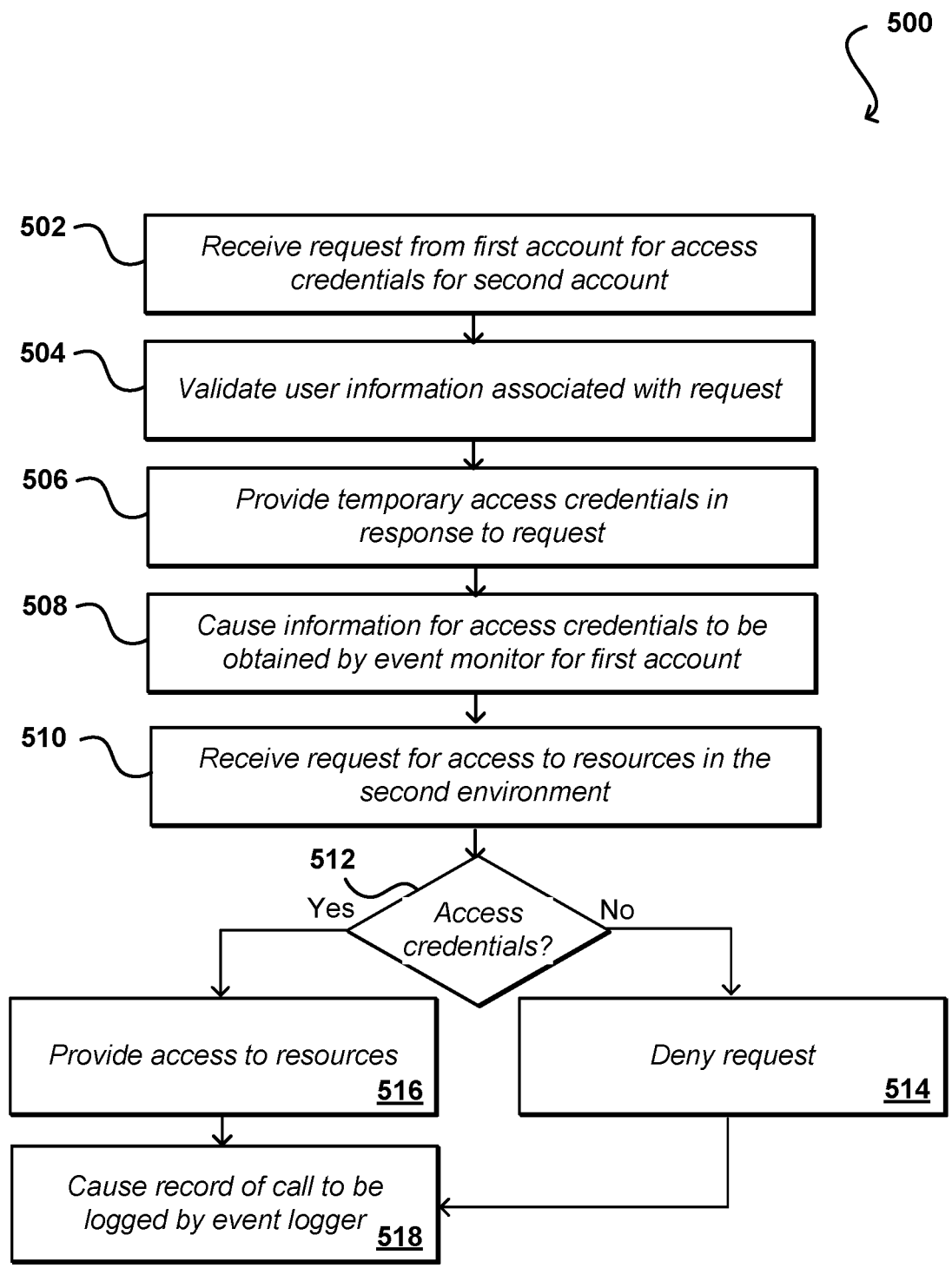
FIG. 5 illustrates an example process for causing information for an access event to be stored for both a production account and a development account that can be utilized in accordance with various embodiments.

FIG. 5 illustrates an example process 500 for providing user information for cross-account role assumption that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request for access credentials can be received 502, where the request is initiated from a component associated with a first environment, such as a development environment (including, for example, physical and/or virtual resources and associated networking) associated with a development account, and the access relates to resources in a second environment, such as a production environment associated with a production account. Other environments can take advantages of aspects of the process as well as discussed and suggested elsewhere herein.

Within the second environment associated with the second account, user information associated with the request can be validated 504 in order to determine whether to grant the requested access. The information can relate to other aspects or entities as well, such as a type of user, role of the user, customer under which the user wants to assume access privileges, etc. The validation can include aspects such as to authenticate a source of the request, determine that a user associated with the request is authorized to obtain the requested access, and the like. Once the request is validated, one or more temporary access credentials can be issued and provided 506 in response to the request. As mentioned, these temporary credentials can take any of a number of different forms, such as may include an access token or a username and password, among other such options. In addition to providing the access credentials, information for the access credentials and/or request can be caused 508 to be obtained by an event monitor for the first account. The information can be provided by, for example, sending a message with the information, sending a notification regarding the availability of the information, or periodically receiving information requests from the event monitor, among other such options.

After the temporary credentials have been issued to a user (or associated component) of the first environment, a request can be received 510 to the second environment. As mentioned, this can be a request received to a specific API or other such interface for the second environment, and can relate to one or more tasks to be performed by resources and/or services associated with the second account. As indicated, the access in this example can require access credentials that enable an assumption of a cross-account role that has privileges with respect to the second account. An analysis of the request can be performed to determine 512 whether the appropriate access credentials are associated with the request. If not, the request can be denied 514. If the correct access credentials are associated with the request, and those credentials are still valid for the requested access, then the access to the corresponding resource(s) and/or service(s) can be provided 516. Whether the access is provided or not, in at least some embodiments, a record or other information for the request can be caused 518 to be logged by an event logger or other component of the second environment.

Figure 6:
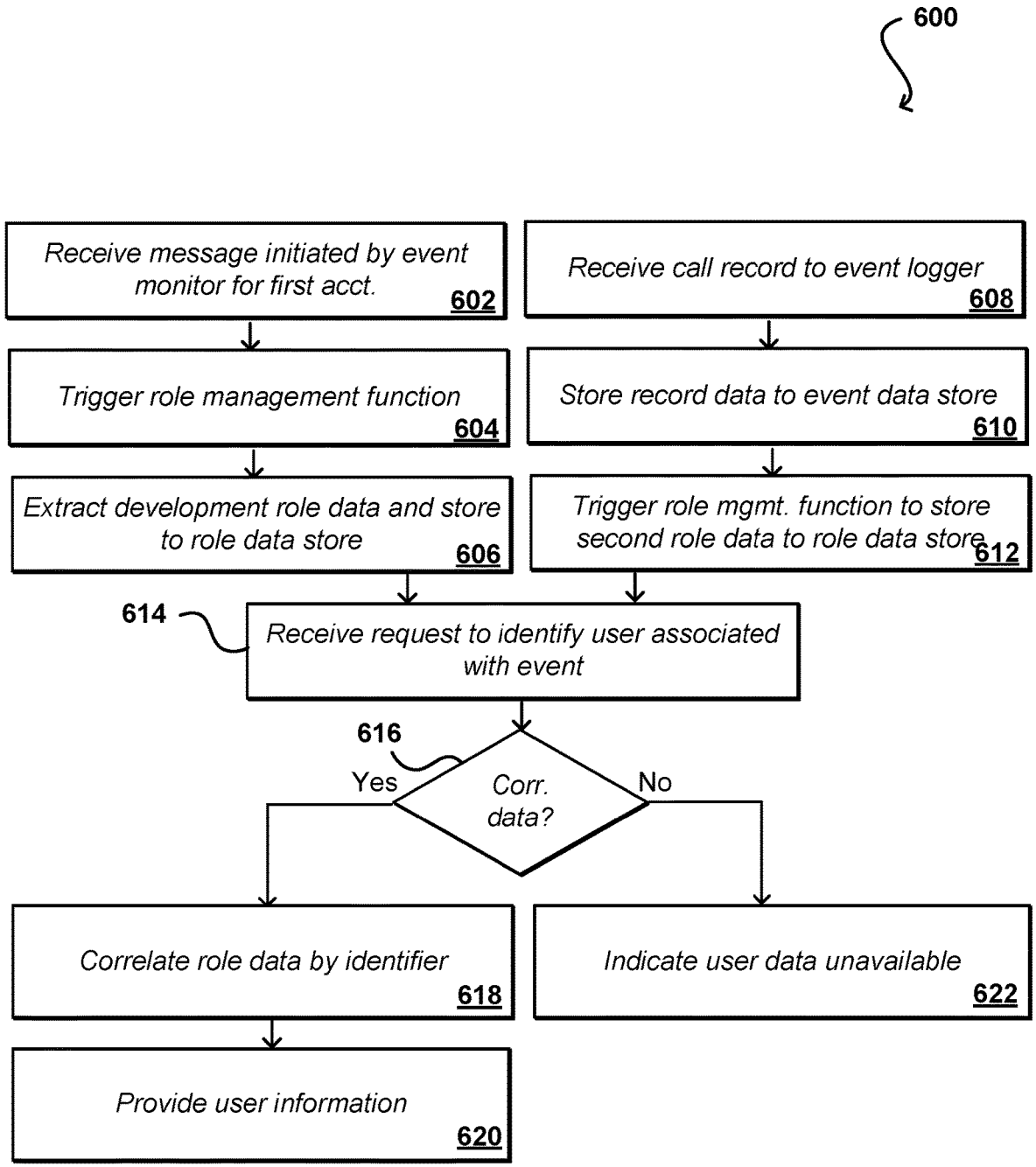
FIG. 6 illustrates an example process for correlating development and production role data stored to a role data store that can be utilized in accordance with various embodiments.

FIG. 6 illustrates an example process 600 for determining user information for access requested using temporary access credentials that can be utilized in accordance with various embodiments. In this example, portions of the process can occur concurrently (or at separate times) using components for the first and second accounts. In a first environment associated with the first account, a message initiated by an event monitor for the development account can be received 602, where that message provides information about the assume role call that was made by a component of the first account and associated with a first user having a role in the first account. This information can include identifying information for the user who requested the role assumption, as well as identifying information for the credentials associated provided to assume that role, among other such options. The receiving of the message by a messaging service or other such component can trigger 604 a role management function, which can be a cross-account function, to be executed within the second environment associated with the second account. The role management function can then extract 606 the development role data, including identifying user information for the user who initially obtained the role, and store that information to a role data store or other such location.

Similarly, within the second environment associated with the second account, a call record can be received 608 to an event logger indicating that a request for access using the temporary credentials was received. A call record also could have been received in some embodiments when the initial assume role request was received, among other such options. The record data can be stored 610 to an event store of the second environment. The storing of the record data can also trigger 612 a role management function in the second environment to store the production role data, including information for the access request, to the role data store or other such location, which in this case corresponds to where data was stored for the development role as well.

A request can subsequently be received 614 to identify a user associated with an event. This can be in response to any of a number of situations or triggers, such as where an event occurred within the second environment and it is desirable to determine the user responsible for the event. For such an event, a determination can be made as to the key or identifier to be used to identify the corresponding records or entries in the role data store. In this example the identifier is a user access key identifier, although other identifiers can be used as well as discussed elsewhere herein. Based at least in part upon the identifier, a determination can be made 616 as to whether there is corresponding data from both the first and second accounts, such that the user to whom access was delegated can be associated with a specific call or event associated with that delegation. If there is not corresponding data, then the user cannot be identified using that approach and it can be indicated 622, through a notification or other such mechanism, that the user data is unavailable. If the corresponding data is available in the role data store, the role data for the accounts can be correlated 618 by the corresponding identifier. The user information, once determined, can then be provided 620 in response to the request. As indicated, the user who initially assumed the role might be different than the user who caused the access request to be submitted, where the second user obtained the credentials from the first user or through another such mechanism. The determination can be used for various purposes. For example, the processing of a task under a request having the temporary credential might meet at least one denial criterion, such as by attempting to gain unpermitted access or perform a forbidden action, etc. Under such conditions, the user having assumed the role can be notified of the action or access based on the temporary credential can be automatically denied, among other such actions. If the access is denied, the original user can be notified and new credentials issued if appropriate.

FIGS. 7 and 8 illustrate examples of event logs or records that can be utilized in accordance with various embodiments. FIG. 7 illustrates an event record 700 that could be generated for an example production account. As illustrated, the record includes information such as the identity of the API caller, the time of the call, the source IP address, the request parameters, and the response elements returned. The entry in bold shows the accessKeyID parameter, which can be used to correlate data from the development environment. From this record it can be determined that an entity used an AssumedRole credential from the CrossAccountTest role to make the API call ListBuckets. As discussed, information about the user who initially assumed the role is not included in the event record 700. Information about the user who initially assumed the role is available from the development account, and thus can be included in the role assumption record 800 received from the development environment as illustrated in FIG. 8. In the role assumption record, the bolded entry again corresponds to the accessKeyID, which can be used to correlate the role assumption record 800 with the event record 700. Since the role assumption record 700 includes information about the assumed role user, that information can now be correlated with the entry record 700 and used for tracking the events associated with the user who assumed the role, among other such purposes. It should be understood that these records are merely examples, and that various formats of records and entries with various combinations of these and other parameters can take advantage of aspects of the various embodiments as well.

Figure 9:
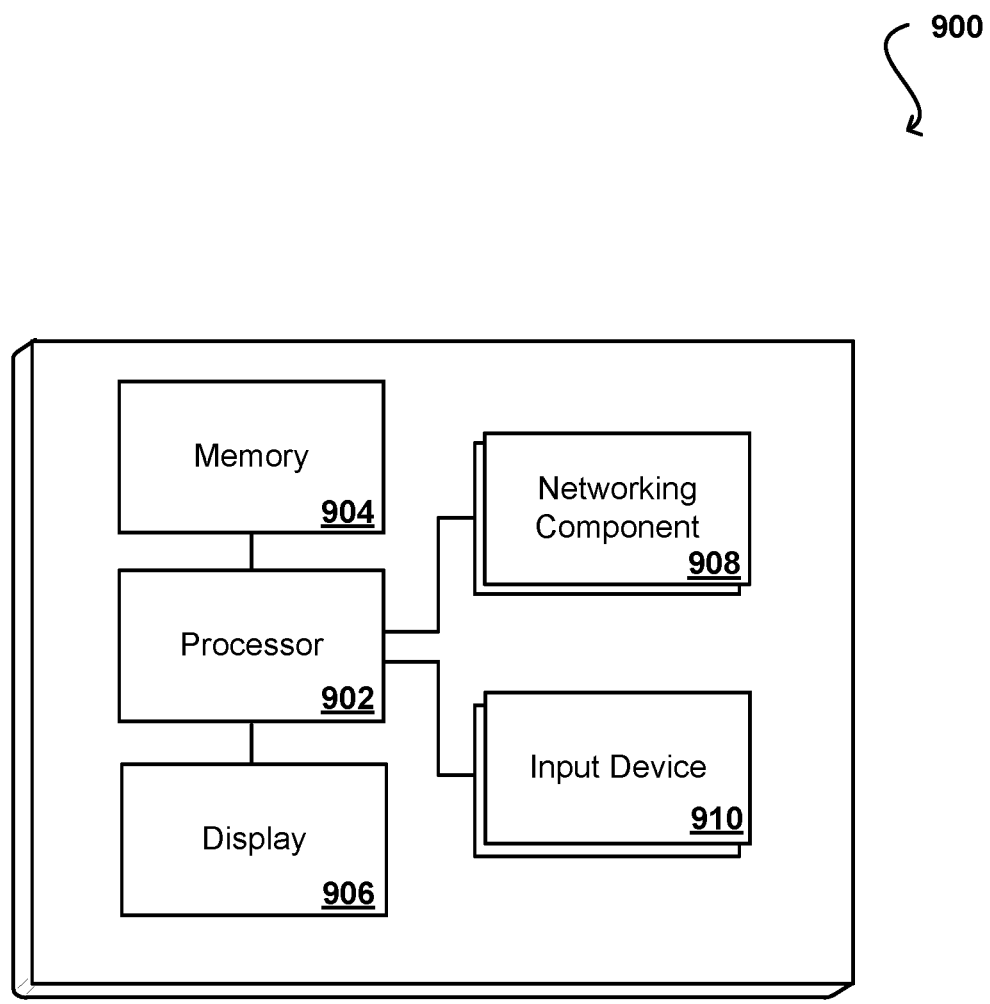
FIG. 9 illustrates example components of a computing device that can be used to implement aspects of various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   requesting a temporary credential, from a user of a first account, to assume a role under a second account, the first account being different than the second account;
   storing, at the first account and via a management component, the temporary credential and an access identifier associated with the temporary credential, the first account having restricted access to users of the first account;
   transmitting identifying information to the second account, the identifying information including at least user information for the user of the first account;
   requesting access to the second account, the request specifying the temporary credential associated with the access identifier and the request being associated with the user of the first account based at least in part on the user information; and
   accessing the second account upon verification of the request via an event repository of the second account, the event repository storing the access identifier and tracking actions of the user after the user obtains access to the second account to identify a specific user of the first account performing the actions.

2. The computer-implemented method of claim 1, further comprising:
   receiving a request to access the management component at the first account;
   requesting one or more security credentials associated with access to the management component;
   determining the one or more security credentials are valid for the management component; and
   providing access to the management component.

3. The computer-implemented method of claim 1, further comprising:
   receiving a verification, from the second account, in response to a valid request for the temporary credential.

4. The computer-implemented method of claim 1, wherein the temporary credential is one of an access token, a secure key, or a username and password pair, the temporary credential configured to expire after a period of time or a number of uses.

5. The computer-implemented method of claim 1, further comprising:
   generating the identifying information based at least in part on the user, wherein the identifying information is different for a second user and the user.

6. The computer-implemented method of claim 1, wherein the first account is associated with a provider of a set of resources and the second account is associated with a customer, wherein an entity associated with the provider is enabled to assume the role in the second account for the customer in order to perform an operation under the second account.

7. The computer-implemented method of claim 1, further comprising:
   sending a message, from a notification service, to the second account in response to the management component receiving the temporary credential.

8. A system comprising:
   at least one processor; and
   memory including instructions that, when executed by the at least one processor, cause the system to:
      request a temporary credential, from a user of a first account, to assume a role under a second account, the first account being different than the second account;
      store, at the first account and via a management component, the temporary credential and an access identifier associated with the temporary credential, the first account having restricted access to users of the first account;
      transmit identifying information to the second account, the identifying information including at least user information for the user of the first account;

request access to the second account, the request specifying the temporary credential associated with the access identifier and the request being associated with the user of the first account based at least in part on the user information; and access the second account upon verification of the request via an event repository of the second account, the event repository storing the access identifier and tracking actions of the user after the user obtains access to the second account to identify a specific user of the first account performing the actions.

9. The system of claim 8, wherein the instructions when executed further cause the system to:

receive a request to access the management component at the first account;

request one or more security credentials associated with access to the management component;

determine the one or more security credentials are valid for the management component; and provide access to the management component.

10. The system of claim 8, wherein the instructions when executed further cause the system to:

receive a verification, from the second account, in response to a valid request for the temporary credential.

11. The system of claim 8, wherein the temporary credential is one of an access token, a secure key, or a username and password pair, the temporary credential configured to expire after a period of time or a number of uses.

12. The system of claim 8, wherein the instructions when executed further cause the system to:

generate the identifying information based at least in part on the user, wherein the identifying information is different for a second user and the user.

13. The system of claim 8, wherein the first account is associated with a provider of a set of resources and the second account is associated with a customer, wherein an entity associated with the provider is enabled to assume the role in the second account for the customer in order to perform an operation under the second account.

14. The system of claim 8, wherein the instructions when executed further cause the system to:

send a message, from a notification service, to the second account in response to the management component receiving the temporary credential.

15. A non-transitory computer-readable storage medium storing instructions that, when executed by a processor of a computing device, cause the computing device to:

request a temporary credential, from a user of a first account, to assume a role under a second account, the first account being different than the second account;

store, at the first account and via a management component, the temporary credential and an access identifier associated with the temporary credential, the first account having restricted access to users of the first account;

transmit identifying information to the second account, the identifying information including at least user information for the user of the first account;

request access to the second account, the request specifying the temporary credential associated with the access identifier and the request being associated with the user of the first account based at least in part on the user information; and access the second account upon verification of the request via an event repository of the second account, the event repository storing the access identifier and tracking actions of the user after the user obtains access to the second account to identify a specific user of the first account performing the actions.

16. The computer-implemented method of claim 15, wherein the instructions when executed further cause the computing device to:

receive a request to access the management component at the first account;

request one or more security credentials associated with access to the management component;

determine the one or more security credentials are valid for the management component; and provide access to the management component.

17. The computer-implemented method of claim 15, wherein the instructions when executed further cause the computing device to:

receive a verification, from the second account, in response to a valid request for the temporary credential.

18. The non-transitory computer-readable storage medium of claim 15, wherein the temporary credential is one of an access token, a secure key, or a username and password pair, the temporary credential configured to expire after a period of time or a number of uses.

19. The computer-implemented method of claim 15, wherein the instructions when executed further cause the computing device to:

generate the identifying information based at least in part on the user, wherein the identifying information is different for a second user and the user.

20. The non-transitory computer-readable storage medium of claim 15, wherein the first account is associated with a provider of a set of resources and the second account is associated with a customer, wherein an entity associated with the provider is enabled to assume the role in the second account for the customer in order to perform an operation under the second account.

* * * * *